United States Patent [19]

Guislain

[11] Patent Number: 4,697,779

[45] Date of Patent: Oct. 6, 1987

[54] ARTICULATION DEVICE FOR USE IN RAISING AND SUPPORTING AN ANTENNA MAST

[76] Inventor: Guy Guislain, 103 Grand'rue, 59158 Maulde, France

[21] Appl. No.: 745,933

[22] Filed: Jun. 18, 1985

[30] Foreign Application Priority Data

Jun. 18, 1984 [FR] France ............................... 84 10001

[51] Int. Cl.[4] ............................ F16B 7/00; H01Q 1/12

[52] U.S. Cl. ........................................ 248/530; 52/40; 52/116; 343/882; 403/354

[58] Field of Search ........................ 343/880, 881, 882; 52/40, 119, 116; 248/530, 533, 514, 156, 545, 532; 403/354

[56] References Cited

U.S. PATENT DOCUMENTS

| | | | |
|---|---|---|---|
| 205,459 | 6/1878 | Yarbrough | 52/40 |
| 827,794 | 8/1906 | Ferris et al. | 52/40 |
| 2,200,338 | 5/1940 | Mason | 343/880 |
| 2,564,065 | 8/1951 | Jaden | 248/533 |
| 2,701,701 | 2/1955 | Wolff | 248/156 X |
| 3,061,960 | 11/1962 | Dull | 52/116 X |
| 3,169,742 | 2/1965 | Smith | 248/156 X |
| 3,280,439 | 10/1966 | McCarthy | 403/354 |
| 3,450,378 | 6/1969 | Cucka | 343/887 X |
| 3,466,715 | 9/1969 | McCarthy | 403/354 |
| 4,167,740 | 9/1979 | Shriver | 343/882 |

FOREIGN PATENT DOCUMENTS

| | | | |
|---|---|---|---|
| 1037063 | 4/1953 | France | 248/533 |

*Primary Examiner*—Daniel M. Yasich
*Attorney, Agent, or Firm*—Kerkam, Stowell, Kondracki & Clarke

[57] ABSTRACT

A device for articulating a base of a mast for raising a mast carrying an antenna into an upright position, the device comprising a mast-engaging member which includes a collar (6) provided on one side with a means for affixing the base (2) of the mast to the member and, on its other side, is provided with two parallel depending plates (8), each having a slotted opening (10), said openings (10) open out at free ends (9) of the plates in order to form a pair of spaced forks, the openings being at least equal in size to the diameter of a journal (11) having a horizontal axis and supported by a stake means (12) that is fixed to the ground (4), whereby the forks permit the member to be articulated about the journal.

4 Claims, 3 Drawing Figures

ARTICULATION DEVICE FOR USE IN RAISING AND SUPPORTING AN ANTENNA MAST

RELATED APPLICATIONS

This application is related to the following applications filed concurrently herewith:

1. "Cylindrical Mast Element For End To End Assembly with Other Elements So As To Constitute a Mast", Guy Guislain and Yves Foissac, U.S. Ser. No. 745,934, now U.S. Pat. No. 4,656,804, corresponding to French application No. 84.09.998.
2. "Device for Raising A Mast And Mast Raised With The Aid Of Such A Device", Jean Paul Perek, U.S. Ser. No. 745,937, corresponding to French application No. 84.10.002.
3. "Device For Wind Bracing the Members Of A Lattice Mast and Lattice Mast Provided with Said Devices", Yves Foissac, Guy Guislain, Frederic Ngo and Philippe Bertin, U.S. Ser. No. 745,940, corresponding to French application No. 84.09.999.

The subject matter of each of said related applications is hereby incorporated by reference.

FIELD OF THE INVENTION

The invention relates to an articulation device at the base of a mast and to a mast articulated with the aid of such a device.

It is applicable more particularly, but not exclusively, to masts for provisional broadcasting or receiving antennas used for either military or civilian purposes.

BACKGROUND OF THE INVENTION

When one wishes to have a provisional antenna which is easily transported and will be used for a very short period, a lightweight mast is generally used to support the antenna, preferably a hollow tubular mast that is kept vertically upright by a bracing means.

At the site where the antenna and mast are to be used, the mast is laid on the ground so that the antenna can be attached to the top of the mast and so that bracing cables can be attached.

Then, to erect the mast, its top is raised from the ground so that by standing behind its base and exercising a balanced traction on at least two cables attached not far from the top, one can progressively raise the top of the mast while its base remains supported on the ground.

Variations in the stability of the terrain result in different conditions in terms of how the soil reacts to stresses put on it when raising the mast and make it difficult to keep the base supported.

OBJECT AND SUMMARY OF THE INVENTION

One result the invention seeks to attain is a device which facilitates the articulation of the base of the mast.

To this end, such a device is the object of the invention, which is characterized in particular in that it includes a collar provided on one side with means for fixation to the base of the mast and on the other side with two parallel plates in which openings are cut which open out at the free end of the plate in order to form forks which are at least equal in size to the diameter of a journal having a horizontal axis supported by a means fixed to the ground.

The invention will be better understood from the ensuing description, provided by way of non-limiting example, taken in conjunction with the drawings.

DESCRIPTION OF THE PREFERRED EMBODIMENT

Figure 1:
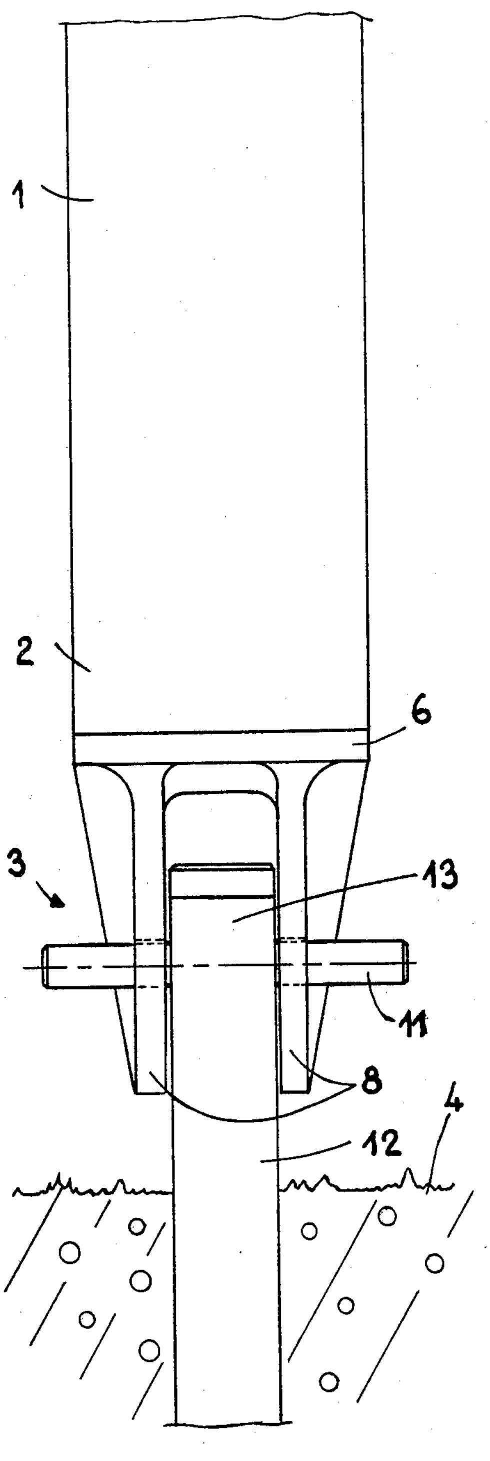
FIG. 1 is a schematic front view of the base of a mast equipped with the device according to the invention.

Turning now to the drawing, the mast 1 is shown to be tubular and may be raised or lowered by being pivoted about its base 2.

To facilitate this maneuver, this base 2 is provided with an articulating device 3 for articulating the mast with respect to the ground 4.

According to a feature of the invention, the articulating device comprises a mast-engaging member which includes a collar 6 provided on one side with a means 7 for affixing the mast-engaging member to the mast, which in the preferred embodiment is a cylindrical post 14 adapted to fit snugly within the base 2 of the tubular mast. The other side of the collar includes two plates 8 depending from said collar, said plates having faces parallel to each other, each of said plates having an opening 10 therein. Each opening opens out at the free end 9 of the plate in order to form a fork in each plate. each fork is at least equal in size to the diameter of a journal 11 having a horizontal axis and supported by a stake means 12 that is fixed to the ground 4. In this manner, the mast can be pivoted or articulated about the journal until it is raised to its vertical position and braced upright by outreaching cables tied to stakes. The stakes may include a journal having a horizontal axis for facilitating tying of the cable at ground level.

In a preferred embodiment of the invention, the stake means 12 that is fixed to the ground 4 comprises a stake driven into the ground, the exposed end 13 of which is traversed by the above-mentioned journal 11 having the horizontal axis.

Furthermore, this stake is preferably of the same type as those used for the bracing.

The affixing means 7 of the mast-engaging member comprises a cylindrical body 14 engaging the inside of the axial housing 15 formed by the internal bore of the mast 1 said cylindrical body having an external diameter substantially equal to the internal diameter of the bore, and the cylindrical body 14 is inserted into the mast until the collar 6 abuts the end face 16 of the bottom of the mast.

Figure 2:
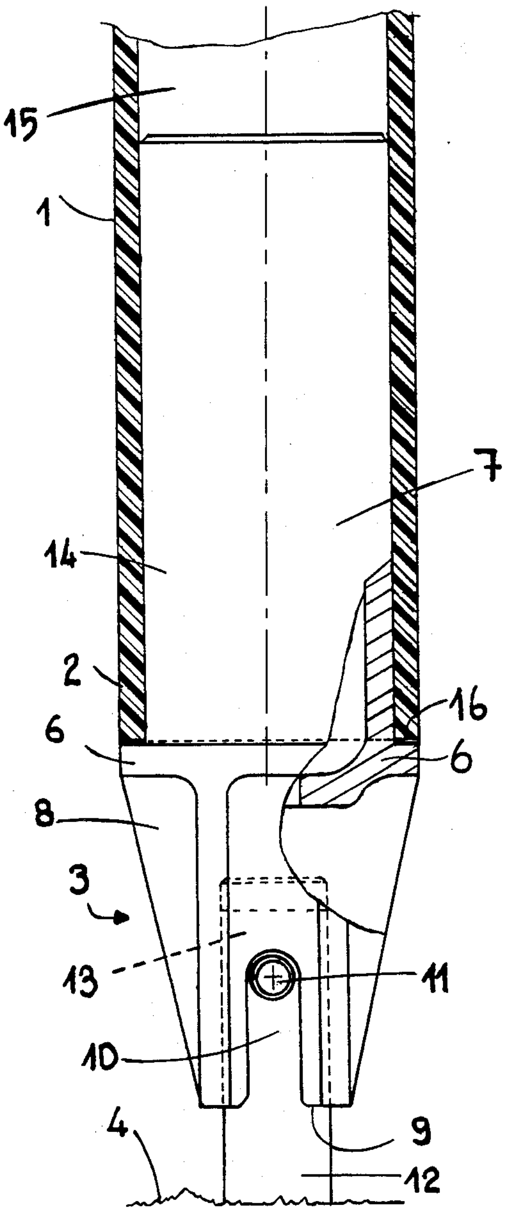
FIG. 2 is a profile view corresponding to FIG. 1.
Figure 3:
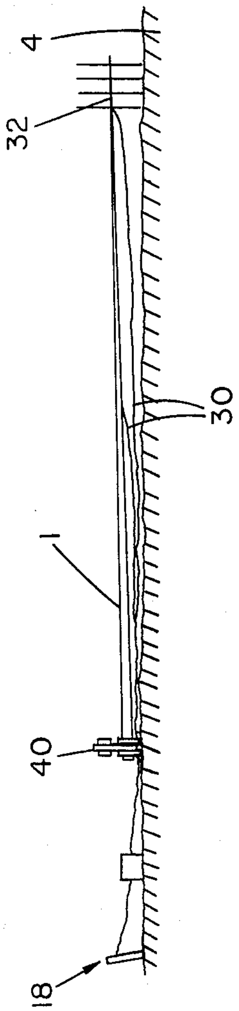
FIG. 3 is a side view of mast with antenna and cables attached.

FIG. 3 is included to show a typical arrangement of an antenna 32 and mast 1 while in the horizontal position. Cables 30 are attached at various points along the length of the mast 1 which will be used to raise the mast 1 to an upright position. The articulation device 40 shown in FIG. 3 is the subject of related U.S. application Ser. No. 745,940, but it can be readily envisioned from reference to FIGS. 1 and 2 that the articulating device of the present invention can be used in an assembly of this type as well.

This device may be realized in cast aluminum, by way of example.

What is claimed is:

1. A device adapted to be used in raising and supporting an antenna mast comprising:

a ground stake adapted to be fixed in the ground, said ground stake having a journal projecting a predetermined distance horizontally from both sides thereof;

a mast-engaging member, said mast-engaging member comprising a collar, a means for affixing said member to said mast, said affixing means extending from a first side of said collar, and two plates having faces parallel to each other, said plates depending from a second side of said collar, each plate having a slot opening which opens out a free end of the plate, said openings forming a pair of spaced forks, said slots being adapted to engage said journal to permit the mast-engaging member to be selectively pivoted about said journal; and means for supporting said mast in a vertical position, whereby, when said member is affixed to said mast and brought into engagement with said journal, said mast will pivot about said journal when said mast is raised from a horizontal to a vertical orientation and when said mast is lowered from said vertical orientation to said horizontal orientation.

2. A device adapted to be used in raising and supporting an antenna mast comprising:

a ground stake adapted to be fixed in the ground, said ground stake having a journal projecting a predetermined distance horizontally from both sides thereof;

a mast-engaging member, said mast-engaging member comprising a collar, a means for affixing said member to said mast, said affixing means extending from a first side of said collar, and two plates having faces parallel to each other, said plates depending from a second side of said collar, each plate having a slot opening which opens out at a free end of the plate, said openings forming a pair of spaced forks, said slots being adapted to engage said journal to permit the mast-engaging member to be selectively pivoted about said journal; and means for supporting said mast in a vertical position, whereby, when said member is affixed to said mast and brought into engagement with said journal, said mast will pivot about said journal when said mast is raised from a horizontal to a vertical orientation and when said mast is lowered from said vertical orientation to said horizontal orientation, and wherein said mast to be raised is tubular and contains an internal bore, and said affixing means comprises a cylindrical post adapted to be inserted into said bore to project interiorly of the mast, said post having an external diameter substantially equal to the diameter of said internal bore.

3. The device of claim 2 wherein said collar is adapted to provide an annular shoulder which will abut an end face (16) of the bottom of said mast when said cylindrical post is inserted into the bore of said mast.

4. A device adapted to be used in raising and supporting an antenna mast comprising:

a ground stake adapted to be fixed in the ground, said ground stake having a journal projecting a predetermined distance horizontally from both sides thereof;

a mast-engaging member said mast-engaging member comprising a collar, a means for affixing said member to said mast, said affixing means extending from a first side of said collar, and two plates having faces parallel to each other, said plates depending from a second side of said collar, each plate having a slot opening which opens out at a free end of the plate, said openings forming a pair of spaced forks, said slots being adapted to engage said journal to permit the mast-engaging member to be selectively pivoted about said journal; and means for supporting said mast in a vertical position, whereby, when said member is affixed to said mast and brought into engagement with said journal, said mast will pivot about said journal when said mast is raised from a horizontal to a vertical orientation and when said mast is lowered from said vertical orientation to said horizontal orientation, said means for supporting said mast in a vertical position further comprising a plurality of bracing stakes for insertion into the ground adapted to receive cables attached to said antenna mast, wherein said bracing stakes and said ground stake of said device have the same configuration.

* * * * *